(12) United States Patent
Lee et al.

(10) Patent No.: US 12,260,439 B2
(45) Date of Patent: Mar. 25, 2025

(54) ELECTRONIC APPARATUS AND DATA MANAGEMENT METHOD THEREOF

(71) Applicant: Coupang Corp., Seoul (KR)

(72) Inventors: Jae Hee Lee, Seoul (KR); Jae Sic Hwang, Seoul (KR); Chang Kwon Jeong, Seoul (KR); Sang Jun Kim, Seoul (KR); Binna Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/382,580

(22) Filed: Jul. 22, 2021

(65) Prior Publication Data

US 2022/0374954 A1    Nov. 24, 2022

(30) Foreign Application Priority Data

May 20, 2021  (KR) .................. 10-2021-0064936

(51) Int. Cl.
  *G06Q 30/0601*  (2023.01)
  *G06F 16/951*   (2019.01)
(52) U.S. Cl.
  CPC ....... *G06Q 30/0603* (2013.01); *G06F 16/951* (2019.01)
(58) Field of Classification Search
  CPC .. G06Q 30/0201–0205; G06Q 30/0601–0643; G06Q 30/08
  See application file for complete search history.

(56) References Cited

U.S. PATENT DOCUMENTS

| | | | | |
|---|---|---|---|---|
| 2007/0055579 | A1* | 3/2007 | Ha | G06Q 30/0641 705/26.62 |
| 2008/0040220 | A1* | 2/2008 | Levy | G06Q 30/0603 705/26.1 |
| 2012/0303412 | A1* | 11/2012 | Etzioni | G06Q 30/06 705/7.31 |
| 2017/0116658 | A1* | 4/2017 | Baid | G06Q 30/0625 |
| 2019/0043117 | A1* | 2/2019 | Veres | G06Q 30/0277 |
| 2020/0118182 | A1* | 4/2020 | Raman | G06Q 30/06 |

FOREIGN PATENT DOCUMENTS

| | | |
|---|---|---|
| KR | 101402146 B1 | 6/2014 |
| KR | 1020160049581 A | 5/2016 |
| KR | 1020170024797 A | 3/2017 |

(Continued)

OTHER PUBLICATIONS

K. Kunti, S. Bharti, A. P. Chaudhuri and S. Padmanabhuni, "Coupling RDF/RSS and WSRP for Dynamic Reusable Portlets: An Approach and a Use Case," 2006 IEEE International Conference on Services Computing (SCC'06), Chicago, IL, USA, 2006, pp. 315-318, doi: 10.1109/SCC.2006.39. (Year: 2006).*

(Continued)

*Primary Examiner* — William J Allen
(74) *Attorney, Agent, or Firm* — Banner & Witcoff, Ltd.

(57) ABSTRACT

Disclosed is a method of managing data by an electronic apparatus, the method including identifying catalog data related to an item, generating target data corresponding to one or more target servers based on the catalog data, generating feed data corresponding to the one or more target servers at intervals of a preset period based on the target data, and transmitting the generated feed data to a corresponding target server.

9 Claims, 5 Drawing Sheets

(56) References Cited

FOREIGN PATENT DOCUMENTS

| | | | |
|---|---|---|---|
| KR | 101735019 | B1 | 5/2017 |
| KR | 101815235 | B1 | 1/2018 |
| KR | 1020180106413 | A | 10/2018 |
| KR | 1020190124630 | A | 11/2019 |
| KR | 102179792 | B1 | 11/2020 |
| KR | 1020200142489 | A | 12/2020 |

OTHER PUBLICATIONS

Ghobadi, A., & Rahgozar, M. (2007). A virtual catalog generated from web pages of vendors for comparative shopping Retrieved from https://dialog.proquest.com/professional/docview/833295671?accountid=131444 (Year: 2007).*

* cited by examiner

ELECTRONIC APPARATUS AND DATA MANAGEMENT METHOD THEREOF

The present application claims priority to and the benefit of Korean Patent Application No. 10-2021-0064936 filed on May 20, 2021, and is incorporated by reference herein in its entirety.

TECHNICAL FIELD

The present disclosure relates to an electronic apparatus that generates feed data corresponding to each target server at intervals of a preset period based on target data unlike the target data updated in real time based on catalog data and a data management method thereof.

DESCRIPTION OF THE RELATED ART

A target server having received feed data from an electronic device provides relevant information to a user of the target server using the feed data. As an example, when Google receives feed data from the electronic device, if a Google user enters a search term, information related to a product corresponding to the search term may be exposed and advertised to the user. As another example, when Facebook receives feed data from the electronic device, Facebook may expose appropriate information to a Facebook user based on records of the user so as to be advertised to the user. Target servers such as Google and Facebook may require different information when publishing relevant information. Thus, the electronic device may generate feed data including information required for each target server and transmit the feed data to the corresponding target server. Alternatively, the electronic device may generate feed data including information not for advertisement, such as sold-out, and transmit the generated feed data to the target server. However, the electronic device may access catalog data every time to generate the feed data, which may lead to a degradation in an efficiency of data management such as overload and processing time delay. Accordingly, there is a desire for technology to improve the efficiency of data management.

DISCLOSURE OF THE INVENTION

An aspect provides an electronic apparatus and a data management method thereof. The goals to be achieved by example embodiments of the present disclosure are not limited to the objectives described above and other objects may be inferred from the following example embodiments.

According to an aspect, there is provided a method of managing data by an electronic apparatus, the method including identifying catalog data related to an item, generating target data corresponding to one or more target servers based on the catalog data, generating feed data corresponding to the one or more target servers at intervals of a preset period based on the target data, and transmitting the generated feed data to a corresponding target server.

The catalog data may include data provided on a detailed page of an item in a service related to the electronic apparatus.

An update of the target data may be performed in real time in response to an update of the catalog data.

The catalog data may be generated based on information input when a seller uploads the item to the electronic apparatus.

A structure of the catalog data may be classified into a first level, a second level, and a third level. The feed data may be generated based on a level determined from the first level and the second level.

The feed data may be generated based on a preset level for each of the target servers among the first level and the second level.

The feed data may include information on an item satisfying a predetermined reference for each of the target servers among a plurality of data according to the determined level among the catalog data.

The predetermined reference for each of the target servers may include a reference related to at least one of price information of the item, attribute information of the item, and delivery information of the item.

When a status of the target data is changed during a preset period unit, the feed data may include information associated with the changed status of the target data.

When a status of the target data is not changed during a preset period unit, the feed data may include information indicating that the status of the target data is not changed.

According to another aspect, there is also provided an electronic apparatus including a memory and a processor configured to identify catalog data related to an item, generate target data corresponding to one or more target servers based on the catalog data, and generate feed data corresponding to the one or more target servers at intervals of a preset period based on the target data.

The catalog data may correspond to data provided on a detailed page of an item in a service related to the electronic apparatus. The processor may be configured to perform an update of the target data in real time in response to an update of the catalog data.

The catalog data may be generated based on information input when a seller uploads the item to the electronic apparatus.

A structure of the catalog data may be classified into a first level, a second level, and a third level. The processor may be configured to generate the feed data based on a level determined from the first level and the second level.

The processor may be configured to generate the feed data including information on an item satisfying a predetermined reference for each of the target servers among a plurality of data according to the determined level among the catalog data.

According to still another aspect, there is also provided a non-transitory computer-readable recording medium including a computer program for performing the above-described method.

Details of other example embodiments are included in the following detailed description and the accompanying drawings.

According to the present disclosure, an electronic apparatus may generate feed data at intervals of a preset period based on target data unlike the target data updated in real time based on catalog data. The electronic apparatus may generate the feed data without accessing the catalog data. In addition, the electronic apparatus may separately manage the catalog data, the target data and the feed data, thereby increasing an efficiency of data management according to parallel processing. Also, although accessing the catalog data every time to generate the feed data may cause a problem, the feed data may be updated in units of the preset period based on the target data, which may lead to the efficiency of data management. Further, when the number of items included in the catalog data increases, a processing time may increase due to the access to the catalog data every time to generate the feed data. In contrast, the feed data may be updated in units of the preset period based on the target data, thereby achieving the efficiency of data management.

Effects of the present disclosure are not limited to those described above and other effects may be made apparent to those skilled in the art from the following description.

DETAILED DESCRIPTION OF THE INVENTION

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meaning: A alone; B alone; C alone; both A and B together; both A and C together; both B and C together; or all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

Figure 1:
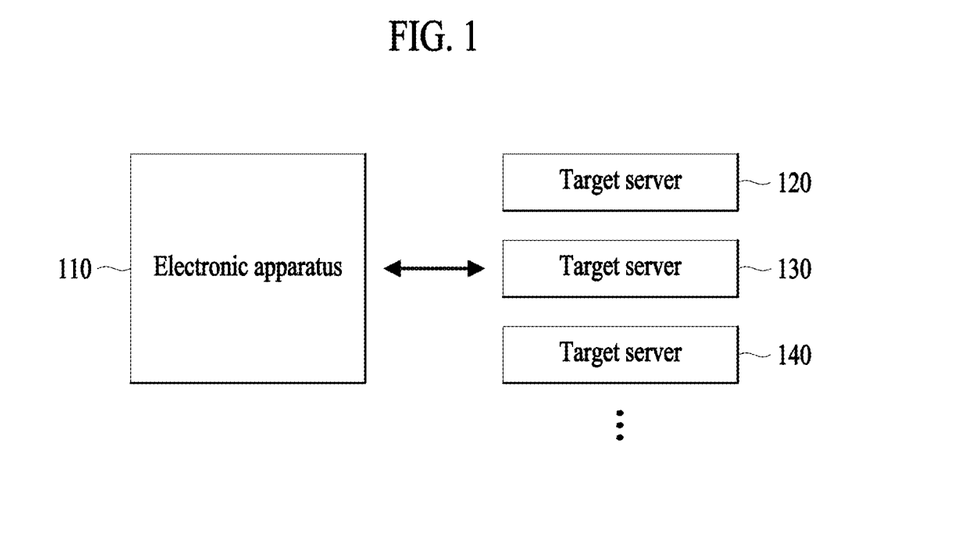
FIG. 1 is a diagram illustrating a relationship between an electronic apparatus and one or more target servers according to an example embodiment.

FIG. 1 is a diagram illustrating a relationship between an electronic apparatus and one or more target servers according to an example embodiment.

FIG. 1 illustrates only components of the system related to the present embodiment. However, it is obvious to those skilled in the art that other general-purpose components may be further included in addition to the components illustrated in FIG. 1.

An electronic apparatus 110 and one or more target servers 120, 130, 140, and the like may communicate with each other in a network. The network may include any one or combinations of a local area network (LAN), a wide area network (WAN), a value added network (VAN), a mobile radio communication network, and a satellite communications network. Also, the network is a comprehensive data communication network that allows network components of FIG. 1 to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultra wideband (UWB), infrared Data Association (IrDA) communication, and near field communication (NFC), but is not limited thereto.

The electronic apparatus 110 may generate feed data corresponding to each target server and transmit the feed data to the corresponding target server. Target servers including the target servers 120, 130, and 140 may be servers capable of displaying and advertising relevant information by receiving the feed data from the electronic apparatus 110 and may correspond to websites such as Google, Facebook, and Naver, for example. As an example, when a user inputs relevant information in the target server 120, the target server 120 may identify information corresponding to a product of a lowest price from information input by the user using the feed data and provide the information corresponding to the product of the lowest price to the user. As another example, for marketing of products to a user accessing the target server 130, the target server 130 may identify information on a product suitable to the user based on records of the user using the feed data and advertise the product by exposing information related to the product to the user.

According to the example embodiment, the electronic apparatus 110 may generate target data corresponding to each of the target servers among catalog data and generate feed data at intervals of a preset period based on the target data. Through this, the electronic apparatus 110 may generate the feed data based on the target data without needing to access the catalog data every time to generate the feed data, thereby achieving efficiency of data management. Hereinafter, a process related to the data management performed in the electronic apparatus will be described in greater detail.

Figure 2:
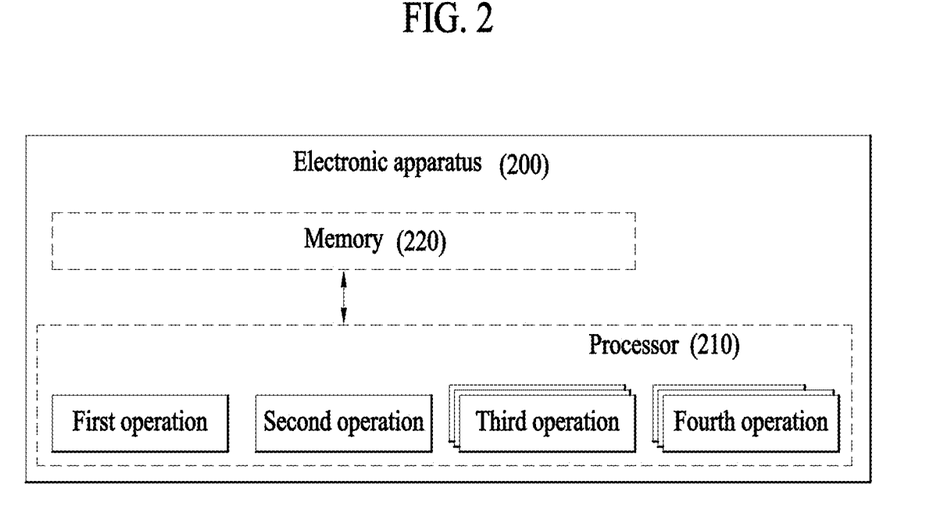
FIG. 2 is a functional block diagram illustrating an electronic apparatus according to an example embodiment.

FIG. 2 is a functional block diagram illustrating an electronic apparatus according to an example embodiment.

Referring to FIG. 2, an electronic apparatus 200 may include a processor 210 and a memory 220. FIG. 2 illustrates only components of the electronic apparatus 200 related to the present example embodiment. However, it will be understood by those skilled in the art that other general-purpose components may be further included in addition to the components illustrated in FIG. 2.

The processor 210 may control an overall operation of the electronic apparatus 200 and process data and a signal. The processor 210 may include at least one hardware unit. In addition, the processor 210 may operate through at least one software module generated by executing program codes.

The processor 210 may perform a first operation of storing relevant information in the memory 220 based on raw data input when a seller uploads an item to the electronic apparatus 200. Specifically, the processor 210 may identify raw data on a plurality of items and perform the first operation of processing information related to each item so as to be stored in the memory 220. For example, items may be structuralized based on a "product—item—vendor item" relationship, so that "product—item—vendor item" relationship information on the items is processed and stored in the memory 220. The "product—item—vendor item" relationship will be described later in greater detail. Here, the memory 220 may store a result according to the first operation. The processor 210 may access the memory 220 and identify relevant information to perform a second operation. In this case, catalog data related to the items may include result data according to the first operation.

The processor 210 may identify the result data according to the first operation and perform the second operation of processing the result data according to the first operation based on a structure for generating target data and storing the processed data in the memory 220. For example, to generate the target data, the processor 210 may perform the second operation processing result data according to the first operation for a product 1 and result data according to the first operation for a product 2 to result data according to the first operation for an item N and storing the processed result data in the memory 220. Here, the memory 220 may store a result according to the second operation. The processor 210 may access the memory 220 and identify relevant information to perform a third operation.

The processor 210 may perform the third operation of generating target data corresponding to one or more target servers by identifying the result data according to the second operation. Specifically, the processor 210 may generate the target data by processing the result data according to the second operation to correspond to each of the target servers. For example, the processor 210 may generate first target data corresponding to a first target server using the result data according to the second operation, generate second target data corresponding to a second target server using the result data according to the second operation, and generate N-th target data corresponding to an N-th target server using the result data according to the second operation. The processor 210 may perform the first operation, the second operation, and the third operation in real time. The target data may be updated in real time in response to an update of catalog data. Here, the memory 220 may store a result according to the third operation. Also, the processor 210 may identify relevant information by accessing the memory 220 to perform a fourth operation.

The processor 210 may perform the fourth operation of generating feed data corresponding to the one or more target servers at intervals of a preset period based on the target data. Specifically, the processor 210 may generate the feed data corresponding to the target server using only the target data according to the third operation at intervals of the preset period. For example, the first target data and the first feed data may correspond to the first target server, the second target data and the second feed data may correspond to the second target server, and the N-th target data and the N-th feed data may correspond to the N-th target server. In this case, the processor 210 may generate the first feed data using only the first target data instead of the catalog data, generate the second feed data using only the second target data instead of the catalog data, and generate the N-th feed data using only the N-th target data instead of the catalog data. Unlike the first operation, the second operation, and the third operation updated in real time, the feed data according to the fourth operation may be updated at intervals of a preset period. Accordingly, the processor 210 may generate the feed data using the target data corresponding to each of the target servers without needing to access the catalog data every time to generate the feed data.

In the example embodiment, a structure of the catalog data may be classified into a first level, a second level, and a third level. Here, the first level may be an uppermost structure and correspond to "product", the second level may correspond to "item", and the third level may be a lowermost structure and correspond to "vendor item." In this case, "item" may correspond to a product, "vendor item" may be a product of which a supplier is specified, and "product" may be an upper category encompassing products. For example, product 1 may correspond to an item. When the product 1 is supplied by a plurality of sellers, a vendor item may correspond to each of the sellers. Also, an upper category encompassing the product 1 may be "product." That is, a product may include a plurality of items so the product and the item have a 1:n relationship. Each item may include a plurality of vendor items so the item and the vendor item have a 1:n relationship. The processor 210 may determine a level for generating the feed data. The catalog data may be classified into the first level, the second level, and the third level of the structure. The feed data may be generated based on the determined level. For example, when the processor 210 selects the first level to generate the feed data, the feed data may be generated in units of the product. Also, when the processor 210 selects the second level to generate the feed data, the feed data may be generated in units of the item. In this instance, the processor 210 may generate the feed data based on a preset level for each target server. For example, in the case of the first target server, the processor 210 may generate the feed data based on the second level set in advance. In the case of the second target server, the processor 210 may generate the feed data based on the first level set in advance. Alternatively, the processor 210 may generate the feed data based on the first level in response to a specific condition being satisfied or, otherwise, may generate the feed data based on the second level.

In the example embodiment, the catalog data and the target data may be classified into a plurality of data based on the determined level. That is, the catalog data and the target data may be classified into a plurality of data in level units. The feed data may include information on an item satisfying a predetermined reference among the plurality of data classified in level units. Specifically, the processor 210 may generate, for each target server, feed data including information on an item satisfying a predetermined reference among the plurality of data classified in level units. In this instance, the predetermined reference is a reference corresponding to each target server and may include a reference related to at least one of price information of the item, attribute information of the item, and delivery information of the item. Here, the price information of the item may include information on a price of the item. The delivery information of the item may include information on whether delivery is free, a delivery distance, and a delivery fee. The attribute information of the item may include first attribute information indicating that the seller has ownership of the item and second attribute information that a manager of the electronic apparatus has ownership of the item. For example, a case in which the seller has ownership of the product 1 and sells the product 1 using the service of the electronic apparatus may correspond to the first attribute information. Also, a case in which the product 1 is sold by the manager of the electronic apparatus who has purchased the ownership of the product 1 from the seller may correspond to the second attribute information. Specifically, the processor 210 may classify the catalog data and the target data into a plurality of data in units of the first level, generate feed data including information on an item having a lowest price among the classified data, and transmit the feed data to the target server. In addition, the processor 210 may classify the catalog data and the target data into a plurality of data in units of the first level, generate feed data including information on an item having an intermediate price among the classified data, and transmit the feed data to the target server. Also, the processor 210 may classify the catalog data and the target data into a plurality of data in units of the first level, generate feed data including information on an item having a lowest price among items having the second attribute information among the classified data, and transmit the feed data to the target server. In this instance, when an item having the second attribute information is absent, the processor 210 may generate feed data including an item having a lowest price and transmit the feed data to the target server. Alternatively, the processor 210 may classify the catalog data and the target data into a plurality of data in units of the first level. When a lowest price of an item having the second attribute information among the classified data satisfies a reference of free delivery, the processor 210 may generate feed data including information on the corresponding item and transmit the feed data to the target server. When the condition is not satisfied, the processor 210 may generate feed data including information on the item having the lowest price and transmit the feed data to the target server. Alternatively, the processor 210 may classify the catalog data and the target data into a plurality of data in units of the second level. The processor 210 may generate feed data including information on a lowest price among items having the first attribute information among the classified data and transmit the feed data to the target server. Alternatively, the processor 210 may classify the catalog data and the target data into a plurality of data in units of the second level. The processor 210 may generate feed data including information on an item having a lowest price among items having the second attribute information among the classified data and transmit the feed data to the target server, or when an item having the second attribute information is absent, may generate feed data including information on an item having a lowest price and transmit the feed data to the target server. Alternatively, the processor 210 may classify the catalog data and the target data into a plurality of data in units of the second level. When a lowest price of an item having the second attribute information among the classified data satisfies a reference of free delivery, the processor 210 may generate feed data including information on the corresponding item and transmit the feed data to the target server. When a condition is not satisfied, the processor 210 may generate feed data including information on an item having a lowest price and transmit the feed data to the target server. Such references are set for each target server in advance, and in addition to the above, a reference may be set based on other matters.

The processor 210 may transmit the generated feed data to the corresponding target server. The target server may expose an advertisement of the item using the received feed data.

Figure 3:
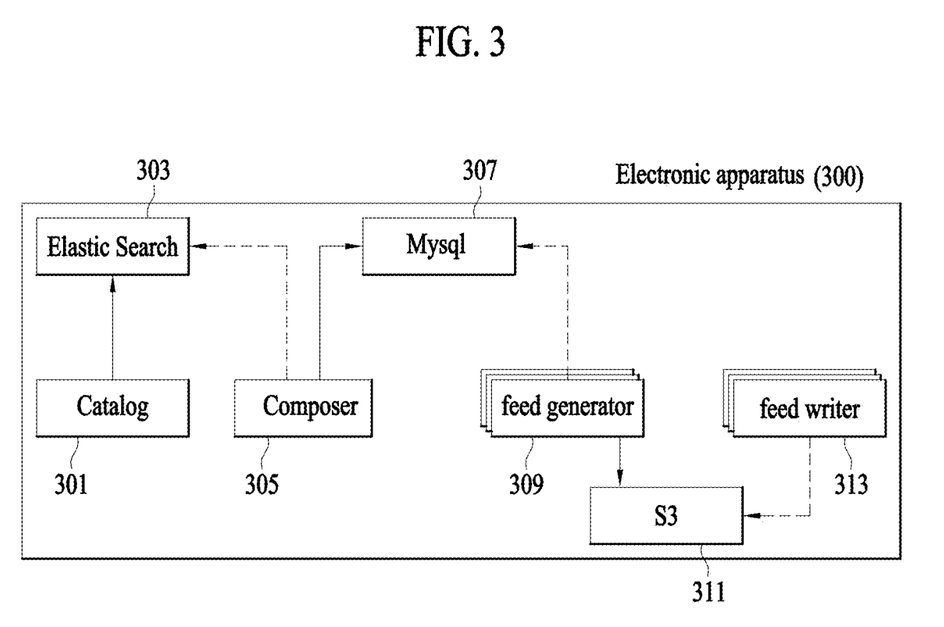
FIG. 3 illustrates an example embodiment for describing data management performed in an electronic apparatus.

FIG. 3 illustrates an example embodiment for describing data management performed in an electronic apparatus.

Referring to FIG. 3, a catalog 301 may identify raw data related to an item input by a seller and perform an operation of storing relevant information in an elastic search 303. In this instance, the catalog 301 may perform an operation of storing relevant information obtained by processing a "product-item-vendor item" relationship in the elastic search 303. The catalog 301 may be executed by a software module and correspond to the first operation by the processor 210 of FIG. 2. A description related to the first operation of FIG. 2 may apply here.

Further, a composer 305 may change information stored in the elastic search 303 into a structure for generating target data and perform an operation of storing relevant information in a Mysql 307. In this instance, the composer 305 may perform an operation of integrating the information stored in the elastic search 303 and storing the integrated information in the Mysql 307 to generate the target data. The catalog data may correspond to information processed by the catalog 301 or the composer 305. The composer 305 may be executed by a software module and correspond to the second operation by the processor 210 of FIG. 2. A description related to the second operation of FIG. 2 may apply here.

Further, a feed generator 309 may correspond to each target server. The feed generator 309 may generate target data corresponding to each target server based on information stored in the Mysql 307. For example, the feed generator 309 may generate the first target data corresponding to the first target server and generate the second target data corresponding to the second target server. The feed generator 309 may upload the target data corresponding to each target server to an S3 311. In this instance, the target data may include information required by the target server, such as an item name, an item image, an item price, item review information, landing uniform resource locator (URL), item discount information, and the like. The landing URL may include link information used by a user of the target server to access a service of the electronic apparatus through the landing URL. Specifically, information required by each target server may be set in advance. Target data may be generated for each target server to include predetermined information corresponding to the target server. As an example, unlike the first target server, the second target server may request the delivery information. Thus, the second target data may include the delivery information unlike the first target data. As another example, the first target server may request age limits for adult products. In this example, the first target data may include relevant information to limit access to the adult products based on age. The feed generator 309 may be executed by a software module and correspond to the third operation by the processor 210 of FIG. 2. Also, a description related to the third operation of FIG. 2 may apply here.

Further, a feed writer 313 may generate feed data corresponding to each target server based on the target data uploaded to the S3 311. Specifically, the feed writer 313 may generate the feed data by filtering the target data stored in the S3 311 so as to be appropriate for each target server. That is, the feed writer 313 may generate the feed data obtained by filtering the target data for each target server. In this instance, a reference for the filtering may be different for each target server, and the above description may apply here.

The feed writer 313 may be executed by a software module and correspond to the fourth operation by the processor 210 of FIG. 2. Also, a description related to the fourth operation of FIG. 2 may apply here.

An electronic apparatus 300 may upload the feed data generated for each target server in the feed writer 313 to a storage location agreed in advance. The target server may receive the uploaded feed data through an application programming interface (API).

Figure 4:
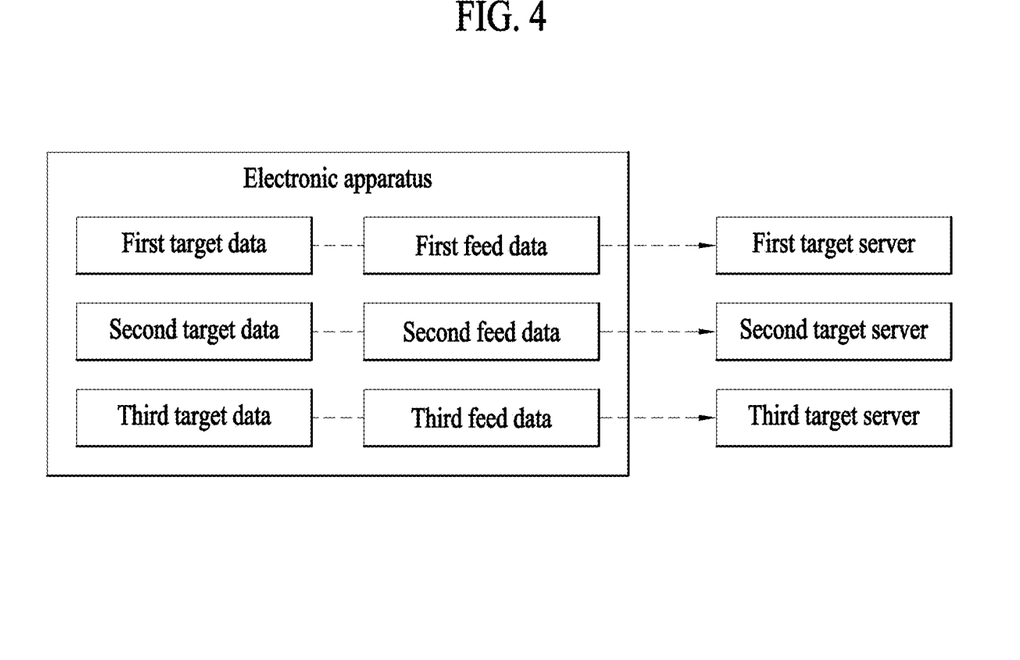
FIG. 4 is a diagram illustrating a relationship of target data, feed data, and a target server according to an example embodiment.

FIG. 4 is a diagram illustrating a relationship of target data, feed data, and a target server according to an example embodiment.

Referring to FIG. 4, an electronic apparatus may generate first target data, second target data, and third target data in real time based on the catalog data. In this instance, using the catalog data, the electronic apparatus may generate first target data, second target data, and third target data including data required from each target server. The electronic apparatus may extract information on an item satisfying a predetermined reference for each target from each target data, thereby generating feed data at intervals of a preset period. For example, first feed data may be generated by extracting information suitable for a predetermined reference corresponding to a first target server from the first target data. Second feed data may be generated by extracting information suitable for a predetermined reference corresponding to a second target server from the second target data. Third feed data may be generated by extracting information suitable for a predetermined reference corresponding to a third target server from the third target data. For example, when a reference related to price information, delivery information, and attribute information of an item is set to correspond to the first target server in advance, the first feed data including information on an item satisfying the corresponding reference may be generated from the first target data, so that the electronic apparatus may transmit the first feed data to the first target server. Alternatively, when a reference previously set to correspond to the second target server is present, the second feed data including information on an item satisfying the corresponding reference may be generated from the second target data, so that the electronic apparatus may transmit the second feed data to the second target server. Alternatively, when a reference previously set to correspond to the third target server is present, the third feed data including information on an item satisfying the corresponding reference may be generated from the third target data, so that the electronic apparatus may transmit the third feed data to the third target server.

Figure 5:
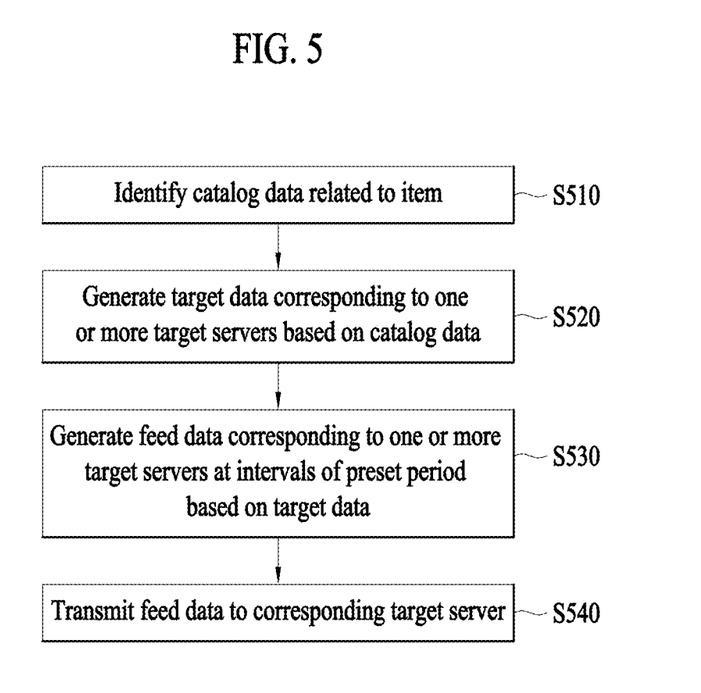
FIG. 5 illustrates an example embodiment of a data management method performed by an electronic apparatus.

FIG. 5 illustrates an example embodiment of a data management method performed by an electronic apparatus.

Referring to FIG. 5, in operation S510, an electronic apparatus may identify catalog data related to an item. Specifically, the electronic apparatus may generate the catalog data based on raw data input when a seller uploads the item to the electronic apparatus. Here, the catalog data may include data provided in a detailed page of the item in a service related to the electronic apparatus. In this instance, a structure of the catalog data may be classified into a first level, a second level, and a third level. Specifically, the catalog data may include information on a plurality of items. The catalog data may be divided into a plurality of data based on the selected level unit. For example, the catalog data including a plurality of items may be divided into a plurality of data based on a first level corresponding to a product unit, or divided into a plurality of data based on a second level unit corresponding to an item unit, or divided into a plurality of data based on a third level unit corresponding to a vendor item unit. For details, the above description can be referred to.

In operation S520, the electronic apparatus may generate target data corresponding to one or more target servers based on the catalog data. Since each target server requires different data, the electronic apparatus may generate target data corresponding to each target server from the catalog data. In this instance, the target data may be updated in real time based on the catalog data and may be data having, for example, a JSON structure.

In operation S530, the electronic apparatus may generate feed data corresponding to the one or more target servers at intervals of a preset period based on the target data. Unlike the target data updated in real time based on the catalog data, the electronic apparatus may generate the feed data based on the target data at intervals of a preset period. In this instance, the electronic apparatus may generate the feed data based on a preset level for each target server among the first level and the second level. Alternatively, among a plurality of data according to a level determined from the catalog data, the electronic apparatus may generate feed data including information on an item satisfying a predetermined reference for each target server. Specifically, in association with the target data based on the catalog data, the electronic apparatus may generate feed data including information on an item satisfying a predetermined reference.

In this instance, when a status of the target data is changed during a preset period unit, the electronic apparatus may generate the feed data including information associated with the changed status of the target data. For example, when the product 1 included in the target data is sold out, the electronic apparatus may generate feed data including information associated with a sold-out status of the product 1. When the feed data is received, the target server may not expose an advertisement of the product 1 sold out. Alternatively, when a status of the target data is not changed during a preset period unit, the electronic apparatus may generate feed data including information indicating that the status of the target data is not changed. For example, when a product 2 is not sold out and the price is also maintained, the electronic apparatus may generate feed data including information indicating that the status of the product 2 is not changed. When the feed data is received, the target server may maintain an advertisement of the product 2.

In operation S540, the electronic apparatus may transmit the feed data to a corresponding target server. The feed data may be generated for each target server. The electronic apparatus may transmit corresponding feed data to each target server.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method of managing data by an electronic apparatus, the method comprising:
    receiving, at the electronic apparatus and from a seller computer system, raw data;
    determining, based on the raw data, relationship information relating to each item among a plurality of items, wherein the relationship information comprises information in which each item is structuralized based on a product-level, an item-level, and a vendor item-level, wherein the product-level is higher than the item-level in a hierarchy structure and the item-level is higher than the vendor item-level in the hierarchy structure;
    storing, at the electronic apparatus, the relationship information in a memory associated with the electronic apparatus;
    generating catalog data by changing information related to the relationship information into a structure for generating target data;
    storing, at the electronic apparatus, the catalog data in the memory associated with the electronic apparatus;
    generating, based on the catalog data, the target data for each of a plurality of target servers including predetermined information requested for each of the plurality of target servers;
    storing, at the electronic apparatus, the target data for each of the plurality of target servers in the memory associated with the electronic apparatus;
    generating feed data by filtering the target data for each of the plurality of target servers, each server of the plurality of target servers having a respective predetermined reference and an associated level identifying at least one of the product-level, item-level, or vendor item-level, wherein the filtering comprises extracting information on items that satisfy the respective predetermined reference for each of the plurality of target servers and that satisfy the associated level for each of the plurality of target servers; and
    transmitting, to a corresponding target server among the plurality of target servers, feed data, of the generated feed data, that corresponds to the corresponding target server,
    wherein the respective predetermined reference comprises a reference related to at least one of price information of the item, attribute information of the item, and delivery information of the item,
    wherein the feed data is generated at intervals of a preset period based on the target data, and
    wherein the target data is updated in real time in response to receiving updated catalog data.

2. The method of claim 1, wherein the raw data is identified based on information input when a seller uploads the item to the electronic apparatus.

3. The method of claim 1, wherein the attribute information of the item comprises first attribute information and second attribute information based on whether a manager of the electronic apparatus has ownership of the item.

4. The method of claim 1, wherein, when a status of the target data is changed during a preset period, the feed data comprises information associated with the changed status of the target data.

5. The method of claim 1, wherein, when a status of the target data is not changed during a preset period, the feed data comprises information indicating that the status of the target data is not changed.

6. A non-transitory computer-readable recording medium comprising a computer program for performing the method of claim 1.

7. An electronic apparatus comprising:
    a computer interface;
    a processor; and
    a memory storing instructions that, when executed by the processor, control the electronic apparatus to:
        receive, at the electronic apparatus via the computer interface and from a seller computer system, raw data;
        determine, based on the raw data, relationship information relating to each item among a plurality of items, wherein the relationship information comprises information in which the each item is structuralized based on a product-level, an item-level, and a vendor item-level, wherein the product-level is higher than the item-level in a hierarchy structure and the item-level is higher than the vendor item-level in the hierarchy structure;
        store, at the electronic apparatus, the relationship information in the memory associated with the electronic apparatus;
        generate catalog data by changing information related to the relationship information into a structure for generating target data;
        store, at the electronic apparatus, the catalog data in the memory associated with the electronic apparatus;
        generate, based on the catalog data, the target data for each of a plurality of target servers including predetermined information requested for each of the plurality of target servers;
        store, at the electronic apparatus, the target data for each of the plurality of target servers in the memory associated with the electronic apparatus;
        generate feed data by filtering the target data for each of the plurality of target servers, each server of the plurality of target servers having a respective predetermined reference and an associated level identifying at least one of the product-level, item-level, or vendor item-level, wherein the instructions to filter comprise instructions to extract information on items that satisfy the respective predetermined reference for each of the plurality of target servers and that satisfy the associated level for each of the plurality of target servers; and transmit, to a corresponding target server among the plurality of target servers, feed data, of the generated feed data, that corresponds to the corresponding target server, wherein the respective predetermined reference comprises a reference related to at least one of price information of the item, attribute information of the item, and delivery information of the item, wherein the feed data is generated at intervals of a preset period based on the target data, and wherein the target data is updated in real time in response to receiving updated catalog data.

8. The electronic apparatus of claim 7, wherein the raw data is identified based on information input when a seller uploads the item to the electronic apparatus.

9. The electronic apparatus of claim 7, wherein the attribute information of the item comprises first attribute information and second attribute information based on whether a manager of the electronic apparatus has ownership of the item.

* * * * *